United States Patent
Fischer et al.

(10) Patent No.: US 11,153,161 B2
(45) Date of Patent: Oct. 19, 2021

(54) INTERNET OF THINGS STRUCTURE WITH A 3D ADAPTION MATRIX

(71) Applicant: Siemens Aktiengesellschaft, Munich (DE)

(72) Inventors: Jan-Gregor Fischer, Zorneding (DE); Thomas Hubauer, Garching bei München (DE); Michael Pirker, Lenggries (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/409,941

(22) Filed: May 13, 2019

(65) Prior Publication Data

US 2019/0356548 A1    Nov. 21, 2019

(30) Foreign Application Priority Data

May 16, 2018 (EP) ..................... 18172675

(51) Int. Cl.
*H04L 12/24* (2006.01)
*H04L 29/08* (2006.01)

(52) U.S. Cl.
CPC ...... *H04L 41/0816* (2013.01); *H04L 41/0823* (2013.01); *H04L 29/08792* (2013.01); *H04L 67/104* (2013.01); *H04L 67/12* (2013.01)

(58) Field of Classification Search
CPC ......... H04W 88/02; H04W 4/46; H04W 4/90; H04L 1/1887; H04L 1/20; H04L 41/12; H04L 67/104; H04L 67/1093; H04L 67/12; H04L 29/08792
See application file for complete search history.

(56) References Cited

U.S. PATENT DOCUMENTS

| | | | |
|---|---|---|---|
| 2012/0233182 | A1 | 9/2012 | Thomas et al. |
| 2016/0065306 | A1* | 3/2016 | Huang ............... H04W 4/46 398/118 |
| 2016/0088049 | A1 | 3/2016 | Seed et al. |
| 2017/0006135 | A1* | 1/2017 | Siebel ............... H04L 69/40 |
| 2017/0195445 | A1 | 7/2017 | Sangar |
| 2018/0054490 | A1* | 2/2018 | Wadhwa ............ G01S 5/0263 |

(Continued)

FOREIGN PATENT DOCUMENTS

| | | |
|---|---|---|
| CN | 102906697 A | 1/2013 |
| CN | 103336813 A | 10/2013 |

(Continued)

OTHER PUBLICATIONS

European Search Report for Application No. 18172675.3, dated Aug. 2, 2018.

*Primary Examiner* — Barbara B Anyan
(74) *Attorney, Agent, or Firm* — Schmeiser, Olsen & Watts LLP

(57) ABSTRACT

An Internet of Things, IoT, structure including application layers with a 3D Adaption Matrix, a server for an IoT structure, a device for an IoT application and a method for manipulating dependencies between the application layers is provided. The 3D Adaption Matrix includes adaption rules, which adaption rules are specified once and which adaption rules enable specifying dependencies between the application layers. A module of the IoT structure is configured to employ the adaption rules for an IoT application.

12 Claims, 1 Drawing Sheet

(56) References Cited

U.S. PATENT DOCUMENTS

2018/0054800 A1* 2/2018 Yeo ................. H04W 72/08
2018/0092118 A1* 3/2018 Kim ............... H04W 72/1205
2019/0349426 A1* 11/2019 Smith ............. G06F 16/1824
2020/0099499 A1* 3/2020 Yeo ................. H04L 1/0009

FOREIGN PATENT DOCUMENTS

| CN | 105453047 A | 3/2016 |
|---|---|---|
| WO | 2016070145 A1 | 5/2016 |

* cited by examiner

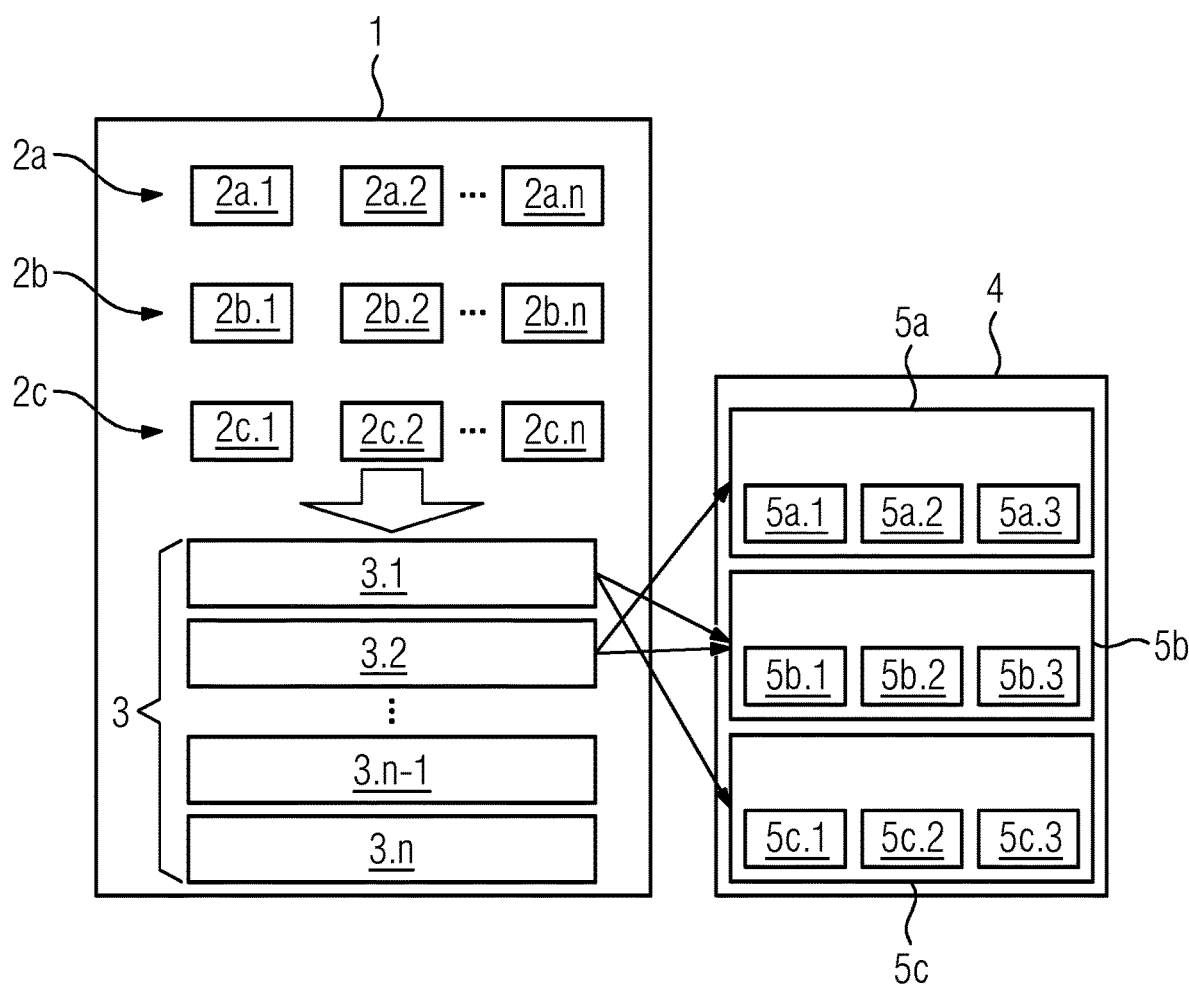

INTERNET OF THINGS STRUCTURE WITH A 3D ADAPTION MATRIX

CROSS-REFERENCE TO RELATED APPLICATIONS

This application claims priority to EP Application No. 18172675.3, having a filing date of May 16, 2018, the entire contents of which are hereby incorporated by reference.

FIELD OF TECHNOLOGY

The following relates to an Internet of Things (IoT) structure comprising application layers with a 3D Adaption Matrix, a server for an IoT structure, a device for an IoT application and a method for manipulating dependencies between the application layers.

BACKGROUND

The so-called Internet of Things (IoT) is a network of physical devices, vehicles, home appliances and other items (things) embedded with electronics, software, sensors, actuators, and connectivity which enable these things to connect and exchange data. Each thing is uniquely identifiable through its embedded computing system but is able to inter-operate within the existing internet infrastructure. The IoT allows things to be sensed or controlled remotely across existing network infrastructure, creating opportunities for more direct integration of the physical world into computer-based systems, and resulting in improved effi-ciency, accuracy and economic benefit in addition to reduced human intervention. The term "things" can be understood as an "inextricable mixture of hardware, software, data and service". These things collect useful data with the help of various existing technologies and then autonomously flow the data between other things. The term "things" thus can refer to a wide variety of devices such as heart monitoring implants, biochip transponders on farm animals, cameras streaming live feeds of wild animals in coastal waters, automobiles with built-in sensors, DNA analysis devices for environmental/food/pathogen monitoring, or field operation devices that assist firefighters in search and rescue operations. The ability to network embedded devices with limited CPU, memory and power resources means that IoT finds applications in nearly every field. Such systems could be in charge of collecting information in settings ranging from natural ecosystems to buildings and factories, thereby finding applications in fields of environmental sensing and urban planning.

The IoT has an event-driven architecture, is bottom-up made (based on the context of processes and operations, in real-time) and considers any subsidiary level. In the IoT, the meaning of an event is not necessarily based on a deterministic or syntactic model but instead on the context of the event itself: this is also a semantic web. Consequently, it does not necessarily need common standards that would not be able to address every context or use: some actors (services, components, and avatars) will accordingly be self-referenced and, if ever needed, adaptive to existing common standards. Building on top of the IoT, the web of things is an architecture for the application layer of the IoT looking at the convergence of data from IoT devices into Web applications to create innovative use-cases. In order to program and control the flow of information in the IoT, a predicted architectural direction is being called BPM Everywhere which is a blending of traditional process management with process mining and special capabilities to automate the control of large numbers of coordinated devices. The IoT requires huge scalability in the network space to handle the surge of devices. For example IETF 6LoWPAN can be used to connect devices to IP networks. With billions of devices being added to the Internet space, IPv6 plays a major role in handling the network layer scalability. IETF's Constrained Application Protocol, ZeroMQ, and MQTT provide lightweight data transport. Fog computing is a viable alternative to prevent such large burst of data flow through Internet. The edge devices' computation power can be used to analyse and process data, thus providing easy real time scalability. IoT frameworks might help support the interaction between things and allow for more complex structures like distributed computing and the development of distributed applications. Some IoT frameworks focus on real-time data logging solutions, offering some basis to work with many things and have them interact.

REpresentational State Transfer (REST) is a scalable architecture that allows things to communicate over Hypertext Transfer Protocol (HTTP) and is easily adopted for IoT applications to provide communication from a thing to a central web server. REST is an architectural style that defines a set of constraints and properties based on HTTP. Web Services that conform to the REST architectural style, or RESTful web services, provide interoperability between computer systems on the Internet. REST-compliant web services allow the requesting systems to access and manipulate textual representations of web resources by using a uniform and predefined set of stateless operations. "Web resources" were first defined on the World Wide Web as documents or files identified by their URLs. However, today they have a much more generic and abstract definition that encompasses everything or entity that can be identified, named, addressed, or handled, in any way whatsoever, on the web. In a RESTful web service, requests made to a resource's URI will elicit a response that may be in XML, HTML, JSON, or some other format. The response may confirm that some alteration has been made to the stored resource, and the response may provide hypertext links to other related resources or collections of resources. When HTTP is used, as is most common, the operations available are GET, POST, PUT, DELETE, and other predefined CRUD HTTP methods. By using a stateless protocol and standard operations, REST systems aim for fast performance, reliability, and the ability to grow, by reusing components that can be managed and updated without affecting the system as a whole, even while it is running. According to REST "well-designed" Web applications behave such that it is a network of Web resources (a virtual state-machine) where the user progresses through the application by selecting links (e.g. /user/tom) and operations (e.g. GET or DELETE), so called state transitions, resulting in the next resource (representing the next state of the application) being transferred to the user for their use.

IoT structures often have the following setup:

A first application layer is an IoT Storage layer comprising an as fast as possible and extensible storage system such as a cloud storage or a (distributed) database system. Depending on the specific application, the data is also partially stored on the things itself, which in fact mimics the functionality of a cloud storage.

A second application layer is an IoT Data Structure layer comprising a pre-defined structure for the data stored in the IoT storage layer described before. An example of a structural definition is a class/instance distinction (e.g. some type of thing and the instantiated things of this type, specifically an asset type (e.g. in a plant) and the specific asset instances (e.g. controllers, production units, etc.) or a definition of what sort of information attributes might hold.

A third application layer is an IoT Interface layer comprising an interaction mechanism to get and set the data. Simple interfaces are preferred. Simple in this context means both access technology (e.g. internet/http based techniques) and expressivity of the interface language (e.g. simple attribute/value retrievals and not SQL expressivity level). An example for a widely accepted interaction mechanism is REST. In combination, these three layers provide functionality foe example for event handling, reporting, time series handling, data structure manipulation, data retrieval and filtering via an abstracted access medium (e.g. internet or superimposed VPN).

With increasing complexity of IoT applications the gap between the storage system functionality of the IoT storage layer and the interaction mechanism of the IoT Interface layer increases. The layer in-between, the IoT Data Structure layer, is often not capable enough to handle both a complex IoT Storage layer beneath and a simple IoT Interface layer above itself. This leads either to inferior exploitation of the storage system functionalities or to unwanted complex interaction mechanisms. For example, if a standard SQL database is used as data storage and the interface is chosen to be REST compliant the user either must have extensive knowledge of constructing SQL queries, or would only use a minimal proportion of the querying possibilities of the system. Also with an IoT data structure sitting between the REST interface and the SQL database this problem is not solved, because the IoT Data Structure layer defines the existence of classes and instances, of what information attributes are made of, etc. but at the moment the user interacts with the IoT via the REST interface only a certain subset of the functionalities of both the chosen data structure and the installed storage system can be used.

Common IoT systems based on data structure definitions for example proposed by Amazon (AWS IoT) or SAP (SAP IoT) or Bosch (Bosch Hono) tend to adapt the IoT Data Structure layer to mostly simple interaction interfaces. As described above the access to the data structure and storage layer thereby suffers from sub-optimal exploitation. In contrast, the creation of more complex data models, which would be better to exploit the capabilities of the storage systems, imposing more complex interaction interfaces is not chosen very often due to the inherent complexity.

But there is no generic approach to flexibly define and interlink the IoT Interface layer, IoT Data Structure layer and IoT Storage layer.

SUMMARY

An aspect relates to solve or at least alleviate the above problems with the Internet of Things structure.

According to a first aspect of the present invention an Internet of Things (IoT) structure comprises application layers. The IoT structure further comprises a 3D Adaption Matrix including adaption rules. The adaption rules are specified once. The adaption rules enable specifying dependencies between the application layers. The IoT further comprises a module. The module is configured to employ the adaption rules for an IoT application.

According to a second aspect of the present invention a server for an IoT structure as described above comprises a memory. The memory stores a 3D Adaption Matrix including adaption rules. The adaption rules are specified once. The adaption rules enable specifying dependencies between application layers of the IoT structure. The server further comprises a processing unit. The processing unit is configured to employ the adaption rules for an IoT application.

According to a third aspect of the present invention a device for an IoT application of an IoT structure as described above is configured to communicate with instances of the IoT structure based on application layers of the IoT structure. Dependencies between the application layers are specified by adaption rules of a 3D Adaption Matrix of the IoT structure, which adaption rules are specified once and employed for the IoT application.

According to a fourth aspect of the present invention a method for manipulating dependencies between application layers of an Internet of Things (IoT) structure comprises the following steps:

Specifying adaption rules of a 3D Adaption Matrix of the IoT structure. The adaption rules enable specifying the dependencies between the application layers.

Employing the adaption rules for an IoT application.

The adaptation rules of the 3D Adaptation Matrix have to be specified manually once, taking into account the possible features of IoT interface types of the IoT Interface layer, data structures elements of the IoT Data Structure layer and storage types of the IoT Storage layer. The IoT structure according to the first aspect may be applied with the server according to the second aspect. The server may be a data processing equipment or a cluster of a plurality of data processing equipments. The server stores the 3D Adaption Matrix in its memory. The processing unit (e.g. microprocessor) employs the adaption rules of the 3D Adaption Matrix for IoT applications running on different data processing equipments. A data processing equipment may be a Microcontroller (µC), an integrated circuit, an Application-Specific Integrated Circuit (ASIC), an Application-Specific Standard Product (ASSP), a Digital Signal Processor (DSP), a Field Programmable Gate Array (FPGA) and the like. The data processing equipment may be part of the device (e.g. machine, apparatus or the like and specifically smartphone, automobile, home appliance, appliance of a smart home and the like). The device hosts or executes an IoT application in the IoT structure.

The IoT structure according to the present invention provides a flexible mechanism to manipulate features of the application layers. Thus, the resources of the server according to the present invention and of the devices/IoT applications of the IoT structure according to the present invention are optimally utilized, because preferably all features of the application are utilized for communication between each of the IoT applications and the server. This leads to an optimized degree of capacity utilisation and reduced workload in the server and devices/IoT applications in the IoT structure.

According to a further aspect of the present invention the application layers comprise an IoT Data Structure layer, an IoT Storage layer and an IoT Interface layer.

The IoT Storage layer can comprise one or a multitude of different storages of the server and or IoT applications. The IoT Data Structure layer comprises at least one data structure (e.g. Amazon AWS IoT or SAP IoT). The IoT Interface layer (e.g. REST) comprises interaction mechanisms. The interaction mechanisms may be simple. Simple in this context means simple access technology like internet/http based techniques and simple expressivity of the interface language like attribute/value retrievals (e.g. GET, POST, PUT, PATCH, DELETE, etc.). The storage or memory of the server, respectively, may be a data storage like a magnetic storage/memory (e.g. magnetic-core memory, magnetic tape, magnetic card, magnet strip, magnet bubble storage, drum storage, hard disc drive, floppy disc or removable storage), an optical storage/memory (e.g. holographic memory, optical tape, Tesa tape, Laserdisc, Phasewriter (Phasewriter Dual, PD), Compact Disc (CD), Digital Video Disc (DVD), High Definition DVD (HD DVD), Blu-ray Disc (BD) or Ultra Density Optical (UDO)), a magneto-optical storage/memory (e.g. MiniDisc or Magneto-Optical Disk (MO-Disk)), a volatile semiconductor/solid state memory (e.g. Random Access Memory (RAM), Dynamic RAM (DRAM) or Static RAM (SRAM)), a non-volatile semiconductor/solid state memory (e.g. Read Only Memory (ROM), Programmable ROM (PROM), Erasable PROM (EPROM), Electrically EPROM (EEPROM), Flash-EEPROM (e.g. USB-Stick), Ferroelectric RAM (FRAM), Magnetoresistive RAM (MRAM) or Phase-change RAM) or a data carrier/medium The resources of the server according to the present invention and of the devices/IoT applications of the IoT structure according to the present invention are optimally utilized, because the storage in the IoT Storage layer and preferably all features of the interface(s) of the IoT Interface layer are utilized for communication between each of the IoT applications and the server based on the data structure of the IoT Data Structure layer.

According to a further aspect of the present invention the module is configured to employ the adaption rules in order to automatically generate an IoT Interface layer, specifically an IoT REST Interface layer, when an IoT Data Structure layer and an IoT Storage layer are given. Alternatively, in the step of employing the adaption rules are employed in order to automatically generate an IoT Interface layer, specifically an IoT REST Interface layer, when an IoT Data Structure layer and an IoT Storage layer are given.

When the definition of the data structure of the IoT Data structure layer has been completed and a storage technology for the IoT Storage layer was chosen the adaption rules can be employed to automatically generate an interface, specifically a REST interface for the IoT Interface layer.

The IoT structure according to the present invention provides a flexible mechanism to link the interface properties (e.g. REST interface characteristics) of the IoT Interface layer with the data structure (e.g. class/instance distinction) of the IoT Data Structure layer and with the storage system (e.g. a relational database) of the IoT Storage layer. For each possible combination (e.g. Interface=REST, data structure defines CLASS/INSTANCE, storage=SQL-DB) a set of rules is defined that specifies the dependencies and implications between the three application layers with their specific technology setup.

According to a further aspect of the present invention the module is configured to employ the adaption rules in order to automatically generate the IoT Interface layer fitting optimally to the IoT Data Structure layer and the IoT Storage layer. Alternatively, in the step of employing the adaption rules are employed in order to automatically generate the IoT Interface layer fitting optimally to the IoT Data Structure layer and the IoT Storage layer.

Given a concrete IoT application, based on a specific set of adaptation rules of the 3D Adaptation Matrix, the IoT application layers can be optimized automatically by employing a rule-based system or reasoning software.

Thus, a flexible mechanism is provided to optimally link the interface properties of the IoT Interface layer with the data structure (e.g. class/instance distinction) of the IoT Data Structure layer and with the storage system (e.g. a relational database) of the IoT Storage layer. For each possible combination (e.g. Interface=REST, data structure defines CLASS/INSTANCE, storage=SQL-DB) an set of rules is defined that optimally specifies the dependencies and implications between the three application layers with their specific technology setup.

According to a further aspect of the present invention the module is configured to employ the adaption rules in order to check data structure features of an IoT Data Structure layer by checking if all possible data structure features of the IoT Data Structure layer have been defined or are used correctly when the IoT Data Structure layer, an IoT Storage layer and an IoT Interface layer are given. Alternatively, in the step of employing the adaption rules are employed in order to check data structure features of an IoT Data Structure layer by checking if all possible data structure features of the IoT Data Structure layer have been defined or are used correctly when the IoT Data Structure layer, an IoT Storage layer and an IoT Interface layer are given.

The adaptation process may be performed during design time. For example, when the data structure of the IoT Data Structure layer is defined and the storage technology of the IoT Storage layer and the interface technology of the IoT Interface layer are already known, the adaptation rules can be employed to check if all possible data structure features have been defined or are used in the right way.

According to a further aspect of the present invention the module is configured to employ the adaption rules at a runtime of the IoT structure in order to check consistency of a new IoT Interface of the IoT application with the application layers of the IoT structure when an IoT Data Structure layer, an IoT Storage layer and the IoT Interface layer are given. Alternatively, in the step of employing the adaption rules are employed in order to check consistency of a new IoT Interface of the IoT application with the application layers of the IoT structure when an IoT Data Structure layer, an IoT Storage layer and the IoT Interface layer are given.

The adaptation process may be applied at runtime. For example, when a second interface (e.g. for another customer) is deployed during runtime, the adaption rules can be used to check the consistency with the currently existing IoT structure (e.g. cloud infrastructure and currently available data structure).

SUMMARY

Some of the embodiments will be described in detail, with reference to the following figures, wherein like designations denote like members, wherein:

The FIGURE schematically shows an Internet of Things application having an Internet of Things structure according to the present invention.

DETAILED DESCRIPTION

In the FIGURE an Internet of Things (IoT) having an IoT structure according to the present invention is depicted. A 3D Adaption Matrix 1 is based on application layers 2 of the IoT structure. The IoT structure comprises an IoT Interface layer 2a with a multitude of IoT Interface types 2a.1-2a.n (e.g. REST, SQL-like, proprietary, etc.), an IoT Data Structure layer 2b with an multitude of Data Structure types 2b.1-2b.n (e.g. class/instance, attributes, etc.) and an IoT Storage layer 2c with an multitude of IoT Storage types 2c.1-2c.n (e.g. cloud storage, database, etc.). The 3d Adaption Matrix 1 comprises a multitude of adaption rules 3, respectively adaption rules 3.1-3.n, based on said application layers 2.

An IoT application 4 comprises three implemented layers 5, namely an interface 5a with three distinct interfaces of a certain interface type (here: REST, SQL-like and proprietary), a data structure 5b with three distinct data structures of a certain data structure type (here: class/instance, attributes and other) and a storage 5c with three distinct storages of a certain storage type (here: cloud storage, database and other).

For example, the IoT Data Structure layer 2b defines that an instance has a specific type (here: an instance "production module 27" in a plant is a "robot" type), the IoT Storage layer 2c defines that a SQL database is used. A resulting adaption rule 3.1 is that (because an instance is mapped to a class) the "InstanceOf" relation in the IoT structure is bound to the mapping of the two SQL tables "Types" and "Instances" (the mapping might be implemented by joining the tables or with a foreign key or other database technology means).

Adaption rule 3.1="structure-storage-rule 23: dataStructure:InstanceOf→storage:join tables(Types,Instances)"

In addition another rule could define the connection between a Class/Instance data structure and how one of the interfaces 5a.1-5a.3 would offer such a kind of data structure in one specific interface (e.g. REST).

Adaption rule 3.2="interface-structure-rule 42: HTTP-GET asset-type→dataStruc-ture:InstanceOf(asset-type)"

As another example, in a simpler constellation a proprietary interface 5a.3 might directly influence the retrieval of attributes in a cloud storage 5c.1.

Adaption rule 3.1="interface-storage-rule 23: readAttribute(X)→Cloud.getAttribute(X);"

This example shows that not only neighbouring layers, but all layers might be influencing each other.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system comprising:
a server for an Internet of Things, IoT, structure, wherein the server includes a memory and a processor,
wherein the IoT structure includes application layers including an IoT Data Structure layer, an IoT Storage layer, and an IoT Interface layer,
wherein the memory stores a 3D Adaption Matrix including adaption rules, which adaption rules are specified once, wherein the adaption rules enable specifying dependencies between the application layers, wherein the dependencies link interface properties of the IoT Interface Layer to a data structure of the IoT Data Structure and a storage system of the IoT Storage Layer for each possible combination of the interface properties, the data structure, and the storage system, such that the server and each IoT application can communicate using the storage system and all interface properties of the IoT Interface Layer, and
wherein the processor is configured to employ the adaption rules for an IoT application.

2. The system according to claim 1, wherein the processor is configured to employ the adaption rules in order to automatically generate an IoT Interface layer, specifically an IoT REST Interface layer, when an IoT Data Structure layer and an IoT Storage layer are given.

3. The system according to claim 2, wherein the processor is configured to employ the adaption rules in order to automatically generate the IoT Interface layer fitting optimally to the IoT Data Structure layer and the IoT Storage layer.

4. The system according to claim 1, wherein the processor is configured to employ the adaption rules in order to check data structure features of an IoT Data Structure layer by checking if all possible data structure features of the IoT Data Structure layer have been defined or are used correctly when the IoT Data Structure layer, an IoT Storage layer and an IoT Interface layer are given.

5. The system according to claim 1, wherein the processor is configured to employ the adaption rules at a runtime of the IoT structure in order to check consistency of a new IoT Interface of the IoT application with the application layers of the IoT structure when an IoT Data Structure layer, an IoT Storage layer and the IoT Interface layer are given.

6. A device comprising the system according to claim 1, wherein the device is configured to communicate with instances of the IoT structure based on application layers of the IoT structure.

7. The device of claim 6, wherein the device is one of a smartphone, automobile, home appliance, and appliance of a smart home.

8. A method for manipulating dependencies between application layers of an Internet of Things, IoT, structure wherein the application layers include an IoT Data Structure layer, an IoT Storage layer, and an IoT Interface layer, the method comprising the following steps:
  specifying adaption rules of a 3D Adaption Matrix of the IoT structure, which adaption rules enable specifying the dependencies between the application layers;
  employing the adaption rules for an IoT application,
  wherein the dependencies link interface properties of the IoT Interface Layer to a data structure of the IoT Data Structure and a storage system of the IoT Storage Layer for each possible combination of the interface properties, the data structure, and the storage system, such that the storage system and all interface properties of the IoT Interface Layer are usable for communication with each IoT application.

9. The method according to claim 8, wherein in the step of employing the adaption rules are employed in order to automatically generate the IoT Interface layer, specifically an IoT REST Interface layer, when the IoT Data Structure layer and the IoT Storage layer are given.

10. The method according to claim 9, wherein in the step of employing the adaption rules are employed to automatically generate the IoT Interface layer fitting optimally to the IoT Data Structure layer and the IoT Storage layer.

11. The method according to claim 8, wherein in the step of employing the adaption rules are employed in order to check data structure features of the IoT Data Structure layer by checking if all possible data structure features of the IoT Data Structure layer have been defined or are used correctly when the IoT Data Structure layer, the IoT Storage layer and the IoT Interface layer are given.

12. The method according to claim 8, wherein in the step of employing the adaption rules are employed at a runtime of the IoT structure in order to check consistency of a new IoT Interface of the IoT application with the application layers of the IoT structure when the IoT Data Structure layer, the IoT Storage layer and the IoT Interface layer are given.

* * * * *